United States Patent [19]

Thatcher

[11] 4,112,380

[45] Sep. 5, 1978

[54] CLOCK SEQUENCING APPARATUS HAVING MORE STATES THAN CLOCK PHASE OUTPUTS

[75] Inventor: Steve Douglas Thatcher, Roseville, Minn.

[73] Assignee: Sperry Rand Corporation, New York, N.Y.

[21] Appl. No.: 706,663

[22] Filed: Jul. 19, 1976

[51] Int. Cl.² .................. H03K 3/04; H03K 1/17; H03K 17/26
[52] U.S. Cl. ................................. 328/62; 307/208; 307/262; 328/63; 328/75
[58] Field of Search .............. 307/208, 232, 262; 328/62, 63, 75, 130, 72–74

[56] References Cited

U.S. PATENT DOCUMENTS

| 3,325,741 | 6/1967  | Arya         | 328/75  |
| 3,437,938 | 4/1969  | Krygowski    | 328/75  |
| 3,478,273 | 11/1969 | Duncan et al.| 328/62  |
| 3,599,011 | 8/1971  | Zwolle       | 307/208 |
| 3,603,810 | 9/1971  | Clayson      | 328/75  |
| 3,808,544 | 4/1974  | Walker       | 328/75  |

OTHER PUBLICATIONS

"Clock Circuit" by Spengler, IBM Tech. Discl. Bull., vol. 18, No. 3, Aug. 1975, pp. 867–868.
"ZN-Phase Generator" by Cukier in IBM Tech. Discl. Bull., vol. 17, No. 9, Feb. 1975, pp. 2644–2645.

Primary Examiner—Stanley D. Miller, Jr.
Attorney, Agent, or Firm—William D. Bauer; Kenneth T. Grace; William E. Cleaver

[57] ABSTRACT

This invention relates to a clock sequencing apparatus which allows for clock stoppage at the end of a particular clock sequence without a false decoding of clock pulses at the beginning of what would have been the next clock sequence. This result is accomplished by providing a multi-state sequential apparatus having more states than clock phases. The apparatus will detect a stop condition on the last clock phase of a clock sequence and instead of changing to the state associated with the first clock phase of the next clock sequence, it will instead change state to one or more additional "dead time" states which will allow other logic circuitry to discontinue gating of the clock phases before the apparatus returns to the state associated with the first phase of the next clock sequence. The apparatus will then remain at the state associated with the first phase of the next clock sequence until the clock is restarted and the process is repeated.

8 Claims, 4 Drawing Figures

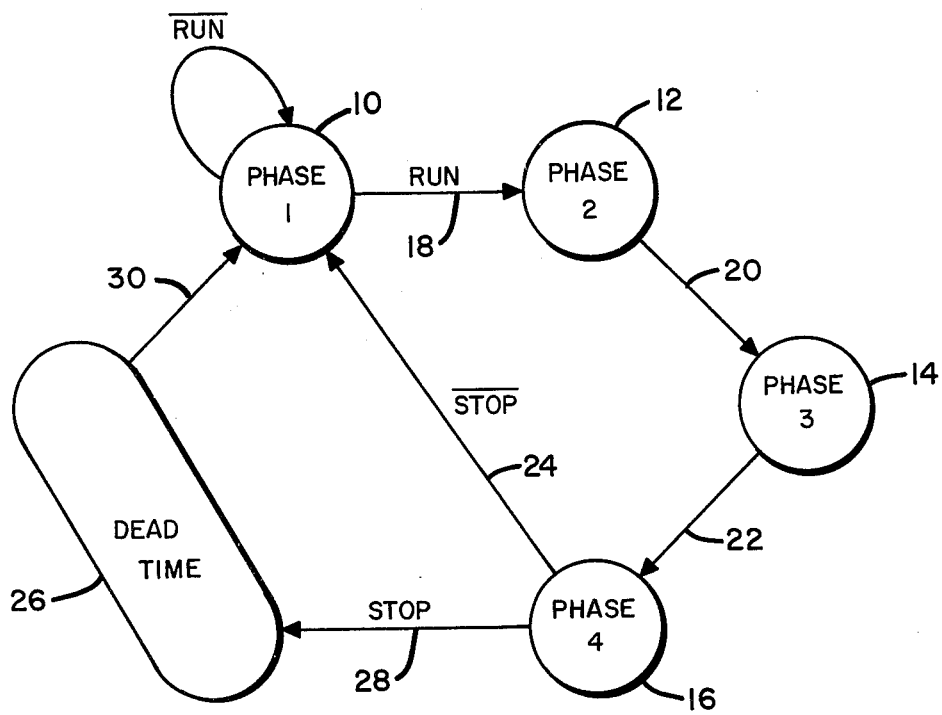
_Fig. 1_
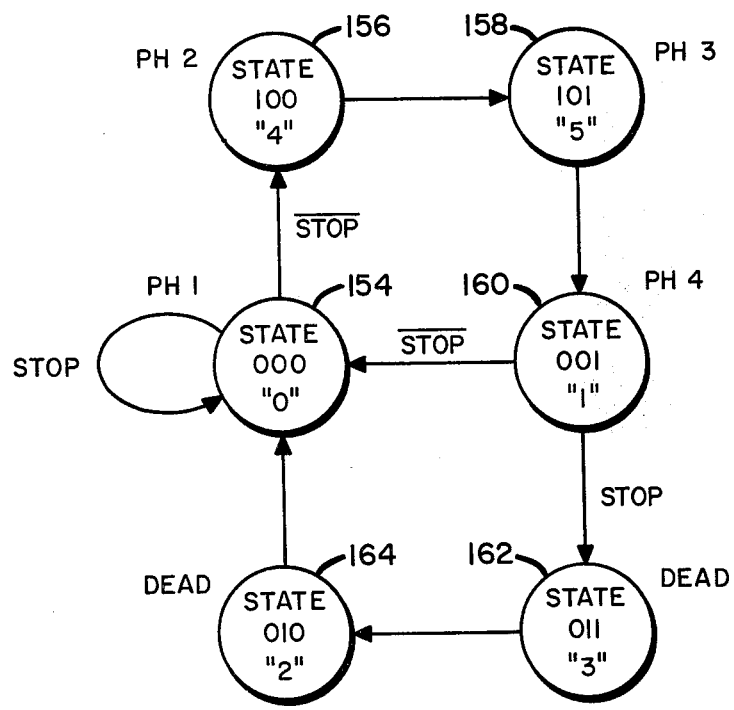
_Fig. 3_

CLOCK SEQUENCING APPARATUS HAVING MORE STATES THAN CLOCK PHASE OUTPUTS

BACKGROUND OF THE INVENTION

In many digital data handling devices, multi-phase clocks are utilized to control the operation of the logic contained therein. In such apparatus it is sometimes desirable to stop or halt the operation of the multi-phase clocks and to resume clock sequencing at a later time. A problem prevalent among clocks which must be stopped at the end of a given sequence is the necessity of disabling the multi-phase clock drivers after the end of the last phase in the sequence and before the start of the first phase in the next sequence. Since the multi-phase clock controls the apparatus' operation, a relatively very short time period is available for this disabling operation. The result is generally either the early termination of the last phase in a sequence or a partial enabling of the first phase of the subsequent sequence.

This problem is especially prevalent in clock networks in which adjacent phases are not underlapped, that is, clock networks in which the first phase of one sequence follows immediately behind the last phase of the preceding clock sequence. There therefore exists no larger amount of time between the last phase of one sequence and the first phase of the next sequence than exists between two adjacent phases in one clock sequence. Since the time between adjacent phases in a multi-phase clock is the smallest time increment available in most of the digital apparatus, there exists no time larger than the smallest unit of time available in which the apparatus' digital logic is able to act to disable the multi-phase clock drivers.

SUMMARY OF THE INVENTION

The present invention provides a solution to the clock stoppage problem by providing a "dead time" between the last phase of one clock sequence and the first phase of the next clock sequence only in those instances in which it is desired to hold the clock sequencing operation. In all other cases the clock sequencing proceeds in the normal manner, that is, directly from the last clock phase in one sequence to the first clock phase in the next sequence.

The present invention provides a clock sequencing apparatus for producing a plurality of clock phases in a predetermined order consisting of a multi-state digital sequential circuit having a separate state for each of the clock phases including a direct correspondence between each clock phase and the state thereof and at least one additional state for which there is no such correspondence, the arrangement being such that the state of the multi-state digital sequential circuit progressively sequences from the state associated with a first of the clock phases through the state associated with a last of the clock phases in the predetermined order and then back to the state associated with the first of the clock phases unless a clock stop signal is present, in which case progression is made from the state associated with the last of the clock phases to the state associated with the additional state and on to the state associated with the first of the clock phases instead of directly from the state associated with the last of the clock phases to the state associated with the first of the clock phases.

OBJECTS

It is an object of the present invention to provide a clock sequencer which will allow stop and restart operation without generating spurious unwanted signals.

It is another object of the present invention to provide a clock sequencer with additional holding states to allow dead time at the end of a sequence in which a stop is to occur.

It is a further object of the present invention to provide a non-underlapped clock which will decode no additional unwanted phases at the end of a sequence when a stop is to occur.

BRIEF DESCRIPTION OF THE DRAWINGS

The foregoing objects, advantages, construction and operation of the present invention will become more readily apparent from the following description and accompanying drawings in which:

FIG. 1 is a general state diagram of a multi-state sequential circuit useful in explaining the present invention.

FIG. 3 is a state diagram illustrating the state switching operation of the circuit described in FIG. 2.

DESCRIPTION OF THE PREFERRED EMBODIMENT

A common means for timing the control mechanism in digital data devices is accomplished through the use of a multi-phase clock sequencing apparatus. Common among such multi-phase clock sequencing apparatus are sequencers which provide four separate phases for every clock sequence. The digital data devices control circuitry may then be controlled through the use of four sequential clock phases.

Figure 4:
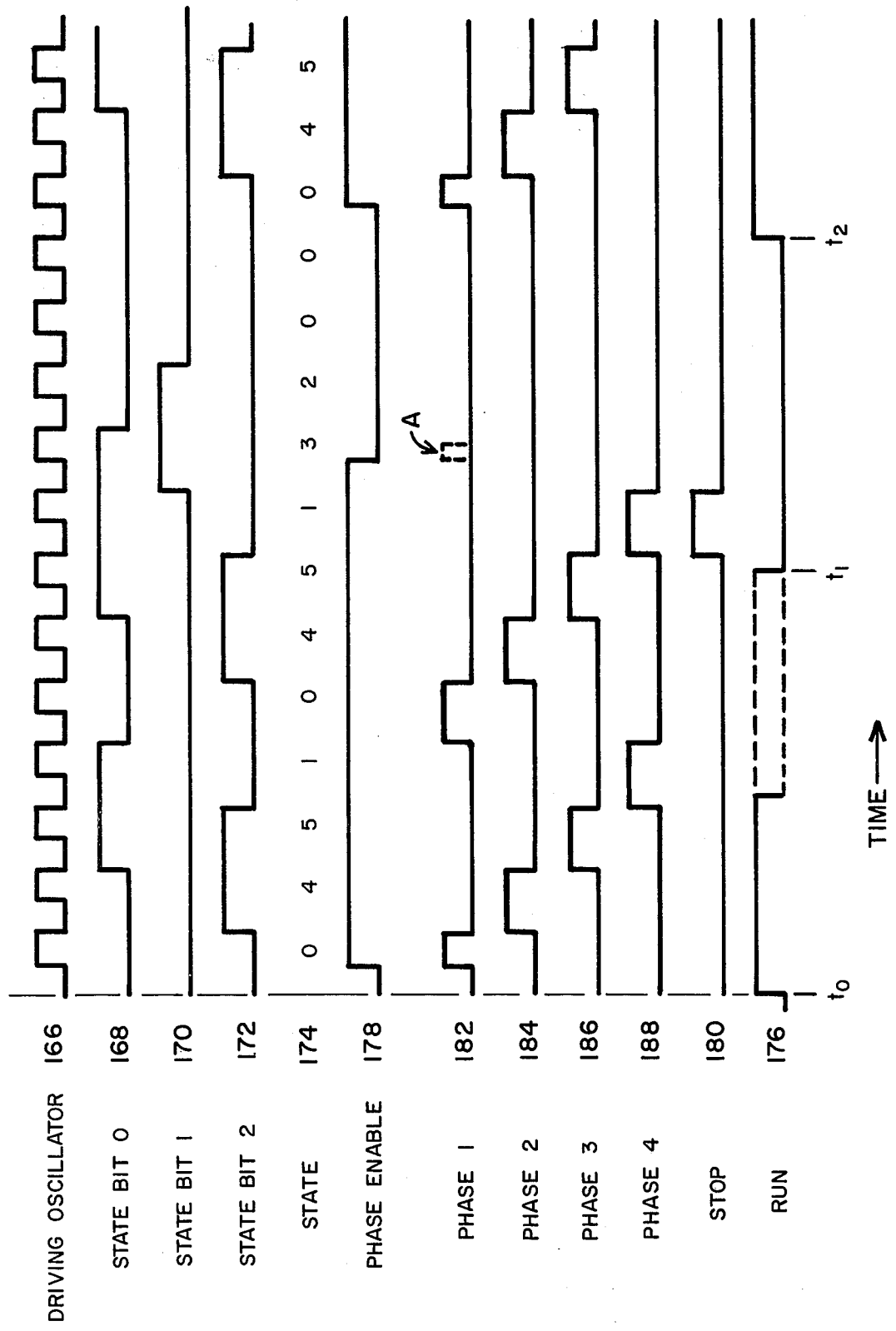
FIG. 4 is a timing diagram illustrating representative forms of the signals present in the circuit described in FIG. 2.

A representative time relationship of these four phases may be readily seen to reference to FIG. 4. Here the four-phase timing pulses are represented by pulses 182, 184, 186 and 188. As can be seen, the clock sequencer produces phase 1, phase 2, phase 3 and phase 4 in exact sequential order and then returns again to phase 1 for another sequence without stopping.

Although the invention described is applicable to all multi-phase clock sequencers, its operation hereinafter will be described with reference to a four-phase clock sequencer with the four phases as illustrated in FIG. 4. Of course, by proper analogy, anyone with ordinary skill in the art may take these same principles and apply them to a multi-phase clock having fewer than four phases or more than four phases. The scope of the present invention is by no means limited to a four-phase clock sequencing apparatus.

Once a multi-phase clock sequencing apparatus is desired, there exists a variety of ways of constructing same. One of the methods available for accomplishing this purpose is to construct a four-phase clock from a multi-state digital sequential circuit. The present invention is applicable to a clock sequencing mechanism constructed from a multi-state digital sequencing circuit.

In a sequential circuit the four phases may be developed by providing the circuit with four separate states, providing means of sequencing through the states in a predetermined order and by providing a decoding mechanism so that each state may be decoded as the proper clock phase.

The operation of such a multi-state digital sequential circuit can be more readily understood by reference to the state diagram of FIG. 1. In FIG. 1 the four states of the digital sequential circuit are represented as circles, phase 1 being represented by circle 10, phase 2 being represented by circle 12, phase 3 being represented by circle 14, and phase 4 being represented by circle 16. In operation, the sequential circuit sequences among the four states 10, 12, 14 and 16 and produces a one clock phase for each of the states. That is, while in state 10 the sequencing apparatus produces clock phase 1; while in state circle 12 the sequencer produces clock phase 2; while in state circle 14 the sequencer produces clock phase 3; and while in state circle 16 the sequencer produces clock phase 4. In normal running operation the sequential circuit sequences from state circle 10 to state circle 12 via line 18, to state circle 14 via line 20, to state circle 16 via line 22, and back again to state circle 10 via line 24. In this manner the four clock phases are produced in a rotating sequence, as illustrated in FIG. 4 by the timing signals 182, 184, 186 and 188.

Referring to FIG. 1, the sequential circuit, while running, will rotate from state circle 10 along line 18 to state circle 12 as long as the clock is continuously running. However, if the clock is in a not-run condition, once phase 1 is reached at state circle 10, the sequencing circuit will continually return to state circle 10 illustrated by line 25 and hold there until the not-run condition is changed to a run condition. In this manner the production of the various clock phases is inhibited while the clock sequencing apparatus is in a not-run condition.

A problem with a sequential circuit producing clock phases in this manner is the transition from a run to a stop condition. Since the sequential circuit itself is producing the clock pulses with which the control circuitry of the digital device is controlled, the sequential circuit is operating at the lowest fundamental frequency of the device. Therefore, when it is desired to stop the clock sequencing after passing through clock phase 4, that is, state circle 16 in FIG. 1, and before the occurrence of the next clock phase 1, that is, state circle 10 in FIG. 1, the only time available is the shortest amount of time known to the digital device, that is the time of one clock phase. It is, therefore, difficult to stop the control and sequencing circuits in such a short time.

That problem is corrected in the present invention by providing an additional state in the sequential circuit beyond those states required for each clock phase. Whenever it is desired to stop the sequencing of the clock, passage is made from state circle 16, which produces clock phase 4, via line 28 to state circle 26 and then from state circle 26 via line 30 back to original state circle 10. The additional state represented by state circle 26 differs from the other states of the sequential circuit in that no clock phase is produced during passage through state circle 26. However, since passage through the additional state circle 26 from state circle 16 to state circle 10, an additional clock time of the digital data device is used thereby allowing additional time for the control and sequencing circuitry of the digital data device to disable the clock drivers.

At the same time, however, the state circle 26 does not impose additional time delays on the clock sequencing apparatus when a stop condition does not exist. Since upon reaching state circle 16 in FIG. 1, the path along line 28 to state circle 26 will only occur if a stop condition exists. In all other occasions passage is made directly from state circle 16 along line 24 directly to state circle 10 where the next clock phase 1 is immediately produced. Thus, the additional state circle 26 imposes no disadvantages upon the timing or sequencing of the apparatus and does allow additional "dead time" to allow the disabling of sequencing of the clock sequencing apparatus. State circle 26, in FIG. 1, is represented as an elongated circle to illustrate the point that in actual construction of the sequential circuit the "dead time" may be represented by one state or more additional states if additional delay time or "dead time" is needed to disable sequencing operations. Therefore, state circle 26 really represents at least one additional state to the four original states in the sequential circuit.

Figure 2:
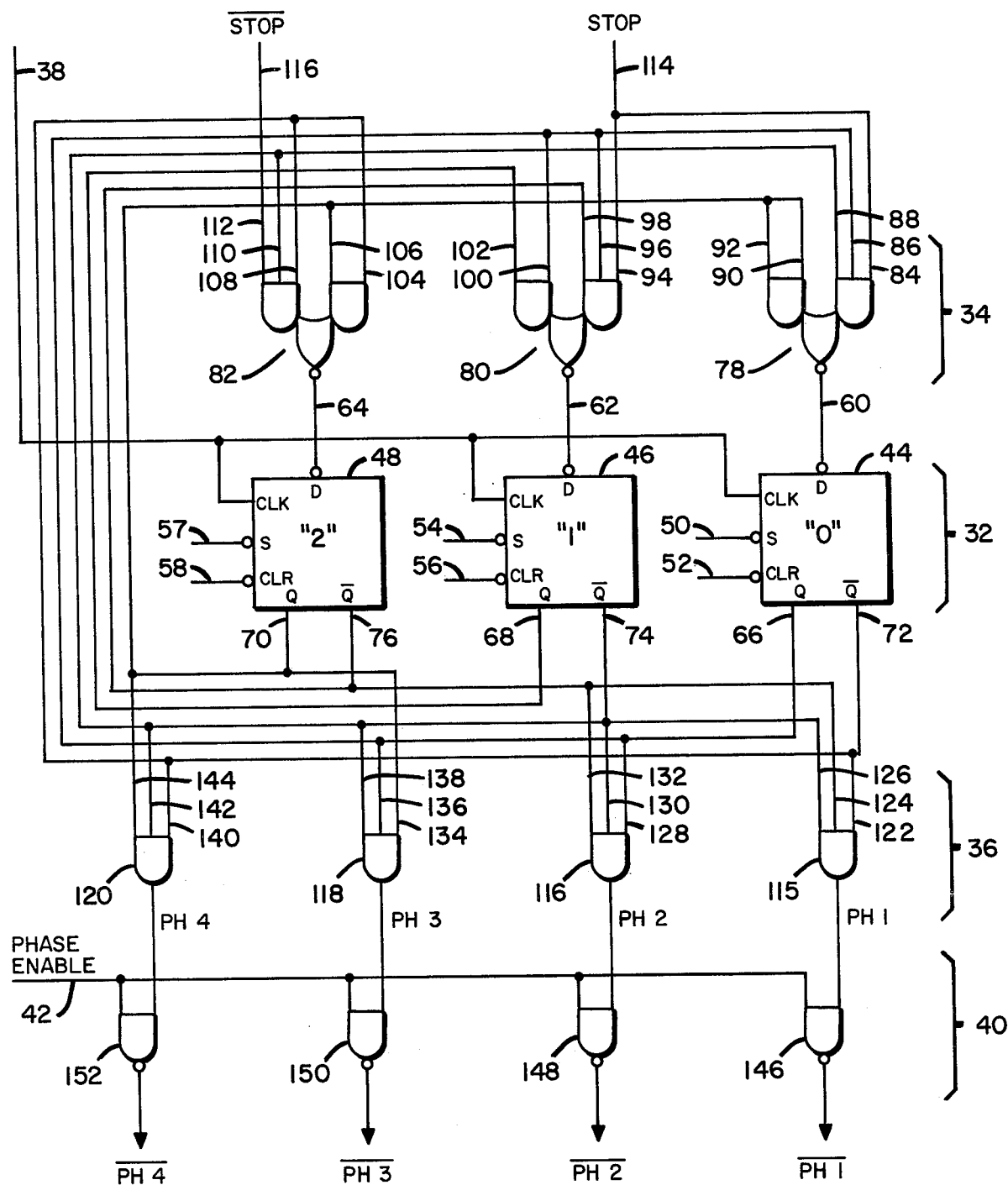
FIG. 2 is a schematic representation of the logical circuit embodying the present invention.

A sequential circuit designated to implement the state diagram illustrated in FIG. 1 is shown in FIG. 2. The circuitry in FIG. 2 may be easily divided into three distinct areas. The circuitry in the middle part of FIG. 2 designated by reference number 32 and consisting of three flip-flops comprise a holding means for holding the current state of the sequential circuit. The current state of the sequential circuit may be ascertained by reference to the data contained in the three flip-flops illustrated.

The second distinct area in FIG. 2 is designated by reference number 34. This circuitry, conisting of a series of combination AND/OR gates, comprise means for controlling the state of the sequential circuit. The circuitry referred to by reference number 34 receives as its inputs the outputs from the state flip-flops 32 and an external signal indicating whether or not a clock stop operation is to occur. This circuitry is then selectively connected to the inputs to the state flip-flops 32 and control the state contained in the state flip-flops 32 upon every period of the regular occurring pulse source 38 based upon the current state in the state flip-flops 32.

The third distinct area of the circuitry described in FIG. 2 comprises the decoding means illustrated as reference number 36. This series of AND gates selectively coupled to the outputs of the state flip-flops 32 comprise a means for decoding the state of the sequential circuit as a particular clock phase and thereby creates the actual clock phase signals which are then distributed to utilization devices in the equipment being timed.

In summary, the state flip-flops 32 comprise a means for holding the current state of the sequential circuit, the state in the state flip-flops being changed and controlled by the control gates 34 based upon the current state contained in the state flip-flops 32 and, finally, the decoding gates 36 connected to the output of the state flip-flops 32 for decoding the various states of the sequential circuit as individual clock phases. The bottom row of gates indicated by reference number 40 are merely a continuation of the control circuitry of the digital data device and provide a means for disabling the output of the various clock phases conditioned upon the presence of a phase enable signal 42. These gates are illustrated only for purposes of showing how a phase enable signal may be utilized to disable the clock phase output at any given time and do not form a part of the present invention, as such. These gates are not necessary for proper utilization and function of the present invention.

The state flip-flops 32 in the sequential circuit are made up of three so-called D-type flip-flops 44, 46 and 48. These three binary flip-flops provide the capability for registering or holding eight separate states. It is necessary to hold at least eight separate states since one more state than clock phases is necessary and there are four clock phases, therefore at least five states are required and thus it is necessary to have three binary flip-flops to contain the five states. Flip-flop 44 represents state bit 0; flip-flop 46 represents state bit 1; and flip-flop 48 represents state bit 2. All three flip-flops 44, 46 and 48 are all connected to a source of regularly occurring pulses 38 which may be a free-running square wave oscillator. It determines the basic clock frequency and phase basing for the digital data device.

The D-type flip-flops also have a low level "set" input and a low level "clear" input for proper initialization of the sequential circuit upon initial start-up. The low level "set" input for flip-flop 44 is indicated by line 50; for flip-flop 46 by line 54; and for flip-flop 48 by line 56. The low level "clear" input for flip-flop 44 is indicated by line 52; for flip-flop 46 by line 56; and for flip-flop 48 by line 58. No particular interconnection of these set and clear signals is indicated in the present circuit since the proper initialization of a sequential circuit depends upon a digital data device in which the sequential circuit is implemented.

As will be indicated below, a proper state for starting the present sequential circuit will be in state 000, and therefore proper initialization would occur by pulsing lines 52, 56 and 58 momentarily to a low level and holding lines 50, 54 and 56 to a high level.

All three of the state flip-flops 44, 46 and 48 are shown as having a low level "D", or data, input. This means that whenever a low signal occurs upon that input, as indicated by line 60 for flip-flop 44; line 62 for flip-flop 46; and line 64 for flip-flop 48, upon the generation of a pulse by the oscillator 38, the flip-flops would go to a "1" or a high state, which would be indicated by a high level on the True output on the flip-flops indicated by reference number 66 for flip-flop 44; 68 for flip-flop 46; and 70 for flip-flop 48. It would also be indicated by a low level at the Not-True (complement) output of the D-type flip-flop which would be indicated in the figure as 72 for flip-flop 44; 74 for flip-flop 46; and 76 for flip-flop 48. On the other hand, if a binary "high" level was present on the lines 60, 62 or 64, when the oscillator 38 occurred, the opposite condition would be present at the outputs of the three flip-flops 44, 46 and 48. That is, the True outputs 66, 68 and 70 would be low and the Not-True outputs 72, 74 and 76 would be high.

The above description of the flip-flops 44, 46 and 48 is a logical description of the state switching of the sequential apparatus. Electrically, however, these low-level D-input flip-flops may be constructed of commonly available high-level D-input flip-flops, such as Texas Instrument Part Number TI SN 14056N. In this case, the low-level D-input logical operation is simulated by reversing the True and Not-True output designations. That is, logically designating the flip-flop manufacturer's True output as the Not-True output and logically designating the flip-flop manufacturer's Not-True output as the True output. Any further reference to the outputs of the flip-flops 44, 46 and 48 will be to the logical designation, that is, as if a low-level D-input flip-flop were utilized.

The control gating means 34 is comprised of three combination AND/OR gates, 78, 80 and 82. These AND/OR gates consist of a two-input AND circuit on one side and three-input AND circuit on the other side, the outputs from which are coupled to a single low level output OR circuit. If both inputs to the two-input AND or the three inputs of the three-input AND are simultaneously high, a low signal will be present upon the single output from the OR gate. An example of such a circuit is Texas Instrument Part Number TI SN 14057N. These three control gates are selectively connected to the low level D-input of the state flip-flops 44, 46 and 48 in order to control the next state of the sequential circuit. Gate 78 is connected via line 60 to state flip-flop 44 and thereby controls state bit 0. Gate 80 is connected via line 62 to flip-flop 46 and thereby controls state bit 1. Gate 82 is connected via line 64 to state flip-flop 48 and thereby controls state bit 2.

Both inputs of the two-input AND gate 78, that is inputs 90 and 92, are connected directly to the True output 70 of flip-flop 48. Thus state bit 0 will be set to a True condition whenever the previous state of the sequential circuit was state 4, 5, 6 or 7. On the three-input AND side of gate 78, input 84 is connected to receive a stop signal via line 114; input 86 is connected to the True input 66 of flip-flop 44, i.e., the True side of state bit 0; and input 88 is connected to the Not-True output 74 of flip-flop 46, i.e., the Not-True condition of state bit 1. These three inputs together provide that state bit 0 will be set to a True condition whenever the previous state was either 1 or 5 and a Stop condition exists.

Input 94 of the three-input AND of gate 80 is also connected to receive the stop signal via line 114; while input gate 96 is connected to the True output 66 of flip-flop 44, i.e., True output of state bit 0; and input 98 is connected to the Not-True output 76 of flip-flop 48, i.e., the Not-True condition of state bit 2. These three signals combined indicate that state bit 1 will be set to a True condition whenever the previous state was 1 or 3 and a Stop condition is present. Input 100 of the two-input AND of gate 80 is connected to the True output 66 of flip-flop 44, i.e., True side of state bit 0; and input 102 is connected to the True output 68 of flip-flop 46, i.e., True state of state bit 1. This two-input AND connected in this manner provides that state bit 1 will be set to a True condition whenever the previous state was either a 3 or a 7.

Input 104 of the two-input AND of gate 82 is connected to the Not-True output 72 of flip-flop 44, i.e., the Not-True condition of state bit 0; and input 106 is connected to the True output 70 of flip-flop 48, i.e., the True state of state bit 2. This two-input AND provides that state bit 2 will be set to a True condition whenever the previous state was either a 4 or a 6.

Input 108 of the three-input AND of gate 82 is connected to the Not-True output 72 of flip-flop 44, i.e., the Not-True condition of state bit 0; while input 110 is connected to the Not-True output 74 of flip-flop 46, i.e, the Not-True condition of state bit 1; and input 112 is connected to receive a $\overline{Stop}$ signal on line 116. This three-input AND gate indicates that state bit 2 will be set to a True condition whenever the previous state was either a 0 or a 4 and a $\overline{Stop}$ signal is present. It should be noted that the $\overline{Stop}$ signal 116 is an exact logical inversion of the Stop signal which appears on line 114. That is, whenever a Stop condition is present a $\overline{Stop}$ condition would not be present, and vice versa.

There has now been descried all of the circuitry required to make the sequential circuit necessary to perform in accordance with the state diagram illustrated in FIG. 1. A more detailed description of the exact sequencing between exact state numbers will be given later.

The decoding means indicated generally by reference number 36 consists of four three-input AND gates 115, 116, 118, and 120. An example of such circuit is Texas Instrument Part Number TI SN14058. This provides one AND gate for each of the four clock phases to be decoded. Gate number 115 decodes clock phase 1; AND gate 116 decodes clock phase 2; AND gate 118 decodes clock phase 3; and AND gate 120 decodes clock phase 4.

Input 122 of AND gate 115 is connected to the Not-True output 72 of flip-flop 44, i.e., Not state bit 0; while input 124 is connected to the Not-True output 74 of flip-flop 46; i.e., Not state bit 1; and input 126 is connected to the Not-True output 76 of flip-flop 48, i.e., Not state bit 2. Since each of the three inputs to AND gate 115 is connected to the Not-True side of the corresponding state bit, the output of AND gate 115 will be a logical high signal whenever all three state bits are 0. Therefore, AND gate 115 will decode clock phase 1 whenever state 000 (zero) of the sequential circuit is reached.

Input 128 of AND gate 116 is connected to the True output 66 of flip-flop 44, i.e., True state bit 0; while input 130 is connected to the Not-True output 74 of flip-flop 46, i.e., Not state bit 1 and input 32 is connected to the Not-True output 76 of flip-flop 48, i.e., Not state bit 2. AND gate 16 therefore will decode clock phase 2 whenever the sequential circuit reaches state 001 (one).

Input 134 of AND gate 118 is connected to the True output 66 of flip-flop 44, i.e., state bit 0, while input 136 is connected to the Not-True output 74 of flip-flop 46, i.e., Not state bit 1, and input 138 is connected to the True output 70 of flip-flop 48, i.e., state bit 2. Thus, AND gate 118 will decode clock phase 3 whenever state 101 (five) of the sequential circuits is reached.

Input 140 of AND gate 120 is connected to the Not-True output 72 of flip-flop 44, i.e., Not state bit 0; while input 142 is connected to te Not-True output 74 of flip-flop 46, i.e., state bit 1, and input 144 is connected to the True output 70 of flip-flop 48, i.e., state bit 2. Thus AND gate 120 will decode clock phase 4 whenever a sequential circuit reaches state 100 (four).

Also illustrated in FIG. 2 are a series of phase enable gates indicated generally by numeral 40, there being one for each clock phase. Although not forming a functional part of the present invention, they are included in FIG. 2 to illustrate one possible means of using a separate phase-enable signal 42 to turn ON or OFF all of the clock phases as the control circuitry in the digital data device may require. It is because of the additional state in the sequential circuit provided for in the present invention that the digital data device may disable the phase-enable signal 42 after completion of clock phase 4 and before the next clock phase 1. As mentioned, there is one phase-enable state for each of the clock phases, 146, 148, 150 and 152. Each of these gates is merely a two-input NAND gate with one of the two inputs collectively tied to the phase-enable signal 42 and the other input selectively coupled to the clock phase decoder circuits 115, 116, 118 and 120, respectively. Thus, the output of NAND gate 146 produces the logical inversion of clock phase 1; the output of NAND gate 148 produces the logical inversion of clock phase 2; the output of NAND gate 50 provides the logical inversion of clock phase 3; and the output of NAND 152 provides the logical inversion of clock phase 4.

Reference to FIG. 3 will result in a clearer understanding of the sequencing of the sequential circuit described in FIG. 2. Beginning for convenience with an initial condition of state 0 in the sequential circuit, state 0 is represented in the modified state diagram of FIG. 3 as circle 154. As noted earlier in the description, while in state 0 clock phase 1 is decoded. It can be seen that if a $\overline{\text{Stop}}$ condition is present on the signal line, that the next state introduced into the state flip-flops in FIG. 2 would be state 4. This is represented in FIG. 3 as circle 156 and would provide a decoding of clock phase 2. State 5 always follows state 4 in the sequential circuit and is represented by circle 158 and would provide a decoding for clock phase 3. State 1 always follows state 5 in the sequential circuit and is represented by circle 160 and provides the decoding for clock phase 4. Since we have now completed one sequence of clock phases 1, 2, 3, 4, the next sequence of the sequential circuit depends upon whether a Stop or $\overline{\text{Stop}}$ condition is present. If a $\overline{\text{Stop}}$ condition is present, the circuit will continue to sequence at its most rapid rate changing directly from state 1 back to state 0 which is again represented by circle 154 and another clock phase 1 is decoded. However, if a Stop condition is present, the state following state 1 would be state 3 represented by circle 162 for which no clock phase is decoded. The state always following state 3 is state 2 represented by circle 164 also for which no clock phase is decoded. Always following state 2 is original state 0 again for which a clock phase 1 is decoded. If the Stop condition is still present upon entering state 0, state 0 will continue to be repeated in the state flip-flops of the sequential circuit. Since no clock phases are decoded for states 3 and 2 represented by circles 162 and 164, additional time is allowed for the control circuitry in the digital data device to turn OFF the phase-enable signals to disable the generation of clock phase 1 upon entry back to state 0.

The signal waveforms illustrated in FIG. 4 are deemed helpful in understanding the operation of the preferred embodiment. At the top of FIG. 4 is a pulse train 166 which represents the output from a source of regularly occurring pulses connected to the clock input terminals of each of the flip-flops 44, 46 and 48 in FIG. 2. Waveforms 168, 170 and 172, respectively, represent the output signals from the state flip-flops 44, 46 and 48 when the pulses of waveform 166 are sequentially applied.

As is illustrated by the lowermost waveform 176, during the period $t_1 - t_0$, the $\overline{\text{Stop}}$ signal is high so that the sequencer is in its run condition. During the period $t_2 - t_1$, the sequencer has a Stop signal applied to control lead 114 in FIG. 2. Finally, at time $t_2$, the $\overline{\text{Stop}}$ signal again goes high.

Indicated by reference numeral 174 are a series of octal digits, which when read from left to right, represent the sequence of states stored by flip-flops 44, 46 and 48 at various times as they are switched by the pulses from the driving oscillator. So long as the $\overline{\text{Stop}}$ signal is high, the state sequence 0, 4, 5, 1 is continuously repeated. However, at time $t_1$, when the Stop signal 180 goes high the sequence changes from 0, 4, 5, 1 to 5, 1, 3, 2, 0, 0 . . . 0 until time $t_2$, when the $\overline{\text{Stop}}$ signal again goes high. At that time the normal sequence 0, 4, 5, 1 is again repeated until a subsequent Stop signal is applied via line 114 to the AND/OR circuits 78 and 80.

Note that the time created by the passage through state 3 and state 2 on the way to state 0 allows time for the control circuitry of the digital data device to lower the phase-enable signal 178 thus preventing the generation of a runt clock phase 1 upon entry back into state 0. The actual generation of the clock phases is illustrated by signal 182 for clock phase 1, signal 184 for clock phase 2, signal 186 for clock phase 3 and signal 188 for clock phase 4. Note that clock phase 1 occurs during state 0, clock phase 2 occurs during state 4, clock phase 3 occurs during state 5 and clock phase 4 occurs during state 1. States 3 and 2 present a "dead time" allowing the digital data logic to turn OFF the phase enable signal 178 preventing the generation of clock phase 1 upon entry into state 0 again. No clock phase 1 is generated until the circuitry is returned to a Run condition and the phase enable is made True. Note that if the sequential circuit had not passed from state 1 to state 3 upon initiation of the Stop sequence, the circuit would have passed instead to state 0, not allowing the control logic of the digital data device time to disable the phase enable signal and allowing the possibility of a creation of a runt clock phase 1 pulse illustrated in the Figure at point A.

Thus, it can be seen that there has been shown and described a novel apparatus for providing a sequential circuit for the production of the multi-phase clock which allows a "dead time" upon clock stoppage to allow the digital data devices' control logic to disable the phase enable signals. It is to be understood, however, that various changes, modifications, and substitutions in the form of the details of the described apparatus can be made by those skilled in the art without departing from the scope of the invention as defined by the following claims:

What is claimed is:

1. A clock sequencing apparatus for producing an output of a sequence containing a predetermined number of clock phases in a fixed time relationship, having a stop signal as an input, said clock sequencing apparatus being capable of terminating sequencing at the end of any said sequence upon the activation of said stop signal comprising:
   (a) holding means for holding a state of the clock sequencing apparatus at any given instant of time, said holding means being capable of holding at least one state for each associated one of said clock phases that are contained in one of said sequences and further being capable of holding at least one additional state for which there is no corresponding clock phase;
   (b) control means, operatively connected to said holding means, for controlling said state of said clock sequencing apparatus based upon a prior state of said clock sequencing apparatus and said stop signal, said control means controlling the sequencing of said apparatus through said states associated with each said clock phase in said fixed time relationship and from the state associated with the last clock phase in the sequence to the state associated with the first clock phase of the next sequence unless said stop signal is activated during the sequence, and, in that case, from the state associated with the last clock phase in the sequence through said additional state to the state associated with the first clock phase of the next sequence; and
   (c) decoding means operatively connected to said holding means for decoding each of said states that are associated with each of said clock phases as that clock phase and decoding said additional state as no clock phase.

2. In a clock sequencing apparatus consisting of a multi-state digital sequential circuit having a stop signal as an input, having an output consisting of a sequence containing a predetermined number of clock phases in a fixed time relationship, and having a separate state for each clock phase and means for sequencing through each state from a first state to a last state in a predetermined order and returning to said first state for continuous operation, the improvement comprising the addition of at least one additional state which has no associated clock phase to said multi-state digital sequential circuit and for passage through said additional state between said last state and said first state if said stop signal is active.

3. A clock sequencing apparatus for producing an output of a plurality of clock phases in a predetermined order and being capable of providing continuous operation by producing a first of said clock phases automatically following the production of a last of said clock phases having a stop signal and a source of regularly occurring pulses as inputs, comprising:
   (a) a state register for holding as a separate state all of said clock phases and at least one additional separate state, said state register having a clock input operatively coupled to said regularly occurring pulses and producing as an output the current state of said clock sequencing apparatus;
   (b) control means, coupled to said state register and coupled to said stop signal, for controlling the state of said state register upon the occurrence of the next said regularly occurring pulse, said control means controlling the sequencing of said state register progrssively from said state associated with said first of said clock phases through to said state associated with said last of said clock phases in the same predetermined order as said plurality of said clock phases occur and then back to said state associated with said first of said clock phases unless said stop signal is active in which case the state contained in said state register will progress from said state associated with said last of said clock phases to said additional separate state and then to said state associated with said first of said clock phases instead of directly from said state associated with said last of said clock phases to said state associated with said first of said clock phases; and
   (c) decoding means, coupled to said state register, for decoding each of said separate states associated with one of said clock phases as that clock phase and decoding said additional separate state as no clock phase.

4. A clock sequencing apparatus as in claim 3 wherein said state register comprises a series of $n$ flip-flops where $n$ is at least 1 plus the number of said plurality of clock phases.

5. A clock sequencing apparatus as in claim 4 wherein said control means comprises a series of AND/OR gates, one for each of said $n$ flip-flops, each having a single output and multiple inputs, said outputs being individually connected to said flip-flops and said multiple inputs being selectively coupled to said flip-flops and to said clock stop signal.

6. A clock sequencing apparatus as in claim 5 wherein said decoding means comprises a series of $m$ AND gates, where $m$ equals the number of said plurality of clock phases, each having n inputs, each of said m AND gates being uniquely associated with one of said clock phases and said n inputs responsive to said flip-flops for activating each one of said series of m AND gates whenever said flip-flops correspond to aid state associated with said clock phase with which each one of said series of m AND gates is uniquely associated.

7. A digital sequential circuit having a plurality of states, having an output of a series of signals representative of said states in a predetermined order and being capable of providing continuous operation by producing a first of said states automatically following the production of a last of said states and said apparatus having an input of a stop signal and a source regularly occuring pulses, comprising:
  (a) a state register for holding as a separate state all of said states and at least one additional separate state, said state register having a clock input operatively coupled to said regularly occurring pulses and producing as said output the current state of said digital sequential circuit; and
  (b) control means coupled to the current state of said digital sequential circuit and to said stop signal, for controlling the state of said state register upon the occurrence of the next said regularly occurring pulse, said control means controlling the sequencing of said state register progressively from said first state through to said last state in the same predetermined order as said series of signals representative of said states occur and then back to said first state unless said stop signal is active in which case the state contained in said state register will progress from said last state to said additional separate state and then to said first state instead of directly from said last state to said first state.

8. A clock sequencing apparatus for producing an output of a plurality of clock phases in a predetermined order and having a stop signal as an input, comprising:
  (a) a multi-state digital sequential circuit having a separate state for each of said clock phases including a direct correspondence between each clock phase and each said separate state and at least one additional state, said multi-state digital sequential circuit sequencing from said state associated with a first of said clock phases through said state associated with a last of said clock phases in said predetermined order and then back to said state associated with said first of said clock phases unless said stop signal is active in which case said multi-state digital sequential circuit sequences from said state associated with said last of said clock phases to said additional state to said state associated with said first of said clock phases instead of directly from said state associated with said last of said clock phases to said state associated with said first of said clock phases; and
  (b) a decoding means, selectively coupled to said multi-state digital sequential circuit, for producing said plurality of clock phases by decoding each of said states associated with a clock phase as that clock phase and by decoding said additional state as no clock phase.

* * * * *

UNITED STATES PATENT AND TRADEMARK OFFICE
CERTIFICATE OF CORRECTION

PATENT NO. : 4,112,380
DATED : September 5, 1978
INVENTOR(S) : Steve Douglas Thatcher It is certified that error appears in the above-identified patent and that said Letters Patent are hereby corrected as shown below:

Column 10, Line 36, "progrssively" should be
-- progressively --.

Column 11, Line 5, "aid" should be -- said --.

Column 11, Line 14, "source regularly" should be
-- source of regularly --.

Signed and Sealed this

Twenty-seventh Day of March 1979

[SEAL]

Attest:

RUTH C. MASON
Attesting Officer

DONALD W. BANNER
Commissioner of Patents and Trademarks